US011680508B2

(12) United States Patent
Brenner

(10) Patent No.: US 11,680,508 B2
(45) Date of Patent: Jun. 20, 2023

(54) EXHAUST-GAS TREATMENT MODULE

(71) Applicant: Purem GmbH, Neunkirchen (DE)

(72) Inventor: Holger Brenner, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/737,699

(22) Filed: May 5, 2022

(65) Prior Publication Data

US 2022/0356832 A1     Nov. 10, 2022

(30) Foreign Application Priority Data

May 6, 2021 (DE) ..................... 10 2021 111 759.3

(51) Int. Cl.
| | |
|---|---|
| *F01N 3/28* | (2006.01) |
| *B01F 25/313* | (2022.01) |
| *B01F 23/213* | (2022.01) |
| *B01D 53/94* | (2006.01) |
| *F01N 3/20* | (2006.01) |

(52) U.S. Cl.
CPC ....... *F01N 3/2892* (2013.01); *B01D 53/9418* (2013.01); *B01D 53/9431* (2013.01); *B01F 23/2132* (2022.01); *B01F 25/31322* (2022.01); *F01N 3/2066* (2013.01); *F01N 2610/02* (2013.01); *F01N 2610/1453* (2013.01)

(58) Field of Classification Search
CPC .. F01N 3/2892; F01N 3/2066; F01N 2610/02; F01N 2610/1453; B01D 53/9418; B01D 53/9431; B01F 23/2132; B01F 25/31322
See application file for complete search history.

(56) References Cited

U.S. PATENT DOCUMENTS

| | | | |
|---|---|---|---|
| 8,707,687 B2 | 4/2014 | Aneja et al. | |
| 8,713,925 B2 * | 5/2014 | Krause | ................ F01N 13/1811 60/322 |
| 10,662,851 B2 * | 5/2020 | Tummala | ............ B01F 25/3133 |

(Continued)

FOREIGN PATENT DOCUMENTS

| | | |
|---|---|---|
| CN | 214304012 U | 9/2021 |
| DE | 10 2010 023 820 A1 | 2/2011 |

(Continued)

OTHER PUBLICATIONS

DE102020007553 Translation, Mar. 2021, Glasmacher.*

*Primary Examiner* — Jesse S Bogue
(74) *Attorney, Agent, or Firm* — Walter Ottesen, P.A.

(57) ABSTRACT

An exhaust-gas treatment module for an exhaust system of an internal combustion engine has a plurality of elements which follow one another in an exhaust-gas flow direction. The elements include a first mixing path with a first reactant dispensing arrangement in an upstream end region of the first mixing path and with a first mixing channel which is elongate in the direction of a first mixing path longitudinal axis. A first exhaust-gas treatment arrangement follows and is elongate in the direction of a first exhaust-gas treatment arrangement longitudinal axis and has an upstream end region connected to a downstream end region of the first mixing path, a second mixing path with a second reactant dispensing arrangement in an upstream end region which is connected to a downstream end region of the first exhaust-gas treatment arrangement.

18 Claims, 6 Drawing Sheets

(56) References Cited

U.S. PATENT DOCUMENTS

| | | | |
|---|---|---|---|
| 2010/0319320 A1* | 12/2010 | Mital | ............... F01N 13/009 60/299 |
| 2015/0071822 A1* | 3/2015 | Stanavich | ............... F01N 3/021 422/128 |
| 2016/0069239 A1* | 3/2016 | Freeman | ............. F01N 13/1888 60/324 |

FOREIGN PATENT DOCUMENTS

| | | | | |
|---|---|---|---|---|
| DE | 10 2016 004 333 A1 | 10/2017 | | |
| DE | 10 2020 007 553 A1 | 3/2021 | | |
| DE | 102020007553 A1 * | 3/2021 | ........... | F01N 13/009 |
| JP | 5057944 B2 | 10/2012 | | |

* cited by examiner

EXHAUST-GAS TREATMENT MODULE

CROSS REFERENCE TO RELATED APPLICATION

This application claims priority of German patent application no. 10 2021 111 759.3, filed May 6, 2021, the entire content of which is incorporated herein by reference.

TECHNICAL FIELD

The present disclosure relates to an exhaust-gas treatment module for an exhaust system of an internal combustion engine, which exhaust-gas treatment module can be used in particular in utility motor vehicles for the purposes of reducing pollutant emissions.

BACKGROUND

To lower the nitrogen oxide fraction in the exhaust gas that is emitted by a diesel internal combustion engine, it is known to inject a urea/water solution as reactant into the exhaust gas in order, in an SCR catalytic converter arrangement that follows downstream of the injection point, to carry out a selective catalytic reduction that leads to the lowering of the nitrogen oxide fraction.

SUMMARY

It is an object of the present disclosure to provide an exhaust-gas treatment module for an exhaust system of an internal combustion engine, which exhaust-gas treatment module, while being of compact construction, leads to an efficient reduction of the pollutant content in the exhaust gas that is emitted by an internal combustion engine and released into the surroundings.

According to the disclosure, the object is achieved by an exhaust-gas treatment module for an exhaust system of an internal combustion engine. The exhaust-gas treatment module includes, following one another in an exhaust-gas flow direction:
- a first mixing path with a first reactant dispensing arrangement in an upstream end region of the first mixing path and with a first mixing channel which is elongate in the direction of a first mixing path longitudinal axis,
- a first exhaust-gas treatment arrangement which is elongate in the direction of a first exhaust-gas treatment arrangement longitudinal axis and which has an upstream end region connected to a downstream end region of the first mixing path,
- a second mixing path with a second reactant dispensing arrangement in an upstream end region, which is connected to a downstream end region of the first exhaust-gas treatment arrangement, of the second mixing path and with a second mixing channel which is elongate in the direction of a second mixing path longitudinal axis,
- a second exhaust-gas treatment arrangement which is elongate in the direction of a second exhaust-gas treatment arrangement longitudinal axis and which has an upstream end region connected to a downstream end region of the second mixing path and which has a downstream end region which is open for the release of exhaust gas and/or reactant,
- the first mixing path longitudinal axis, the first exhaust-gas treatment arrangement longitudinal axis, the second mixing path longitudinal axis and the second exhaust-gas treatment arrangement longitudinal axis being substantially parallel to one another and/or to an exhaust-gas treatment module longitudinal axis, and/or the first mixing path, the first exhaust-gas treatment arrangement, the second mixing path and the second exhaust-gas treatment arrangement overlapping one another at least in certain regions in the direction of the exhaust-gas treatment module longitudinal axis.

The exhaust-gas treatment module constructed in accordance with the disclosure is basically distinguished by the fact that it includes, following one another in a flow direction, two exhaust-gas treatment paths each with a mixing path, in which a mixture of exhaust gas and reactant is generated, and with an exhaust-gas treatment arrangement. The catalytic reaction that is to be performed with the mixture of exhaust gas and reactant in the exhaust-gas treatment module can thus be performed more efficiently. Since, furthermore, the various system regions of the two exhaust-gas treatment paths are arranged so as to be situated substantially parallel to one another and/or so as to axially overlap one another, a compact construction is realized which utilizes the occupied volume in an efficient manner.

It is pointed out that, in the context of the present disclosure, the statement that two system regions, for example a mixing path and exhaust-gas treatment arrangement, are connected to one another is to be understood to mean that, as a result, a flow connection is produced that allows the flow of exhaust gas or of a mixture of exhaust gas and reactant from one of the system regions into the other system region connected thereto. To produce such a connection or flow connection, use may be made of components which are for example of housing-like or pipe-like form and which are each physically connected to the two system regions that are to be connected.

The efficient utilization of the available structural space can be assisted in that the first mixing path, the first exhaust-gas treatment arrangement, the second mixing path and the second exhaust-gas treatment arrangement are arranged so as to follow one another around the exhaust-gas treatment module longitudinal axis, such that the first mixing path and the second mixing path are situated substantially diametrically opposite one another with respect to the exhaust-gas treatment module longitudinal axis and the first exhaust-gas treatment arrangement and the second exhaust-gas treatment arrangement are situated substantially diametrically opposite one another with respect to the exhaust-gas treatment module longitudinal axis. The two mixing paths, which have a smaller dimension transversely with respect to their respective longitudinal axis than the two exhaust-gas treatment arrangements, can thus be accommodated in the space regions that are formed between the two mutually oppositely arranged exhaust-gas treatment arrangements in the peripheral direction with respect to the exhaust-gas treatment module longitudinal axis.

In order to also be able to realize a configuration which is compact in an axial direction with respect to the exhaust-gas treatment module longitudinal axis and which utilizes the available structural space efficiently, it is proposed that the upstream end region of the first mixing path and/or the downstream end region of the first exhaust-gas treatment arrangement and/or the upstream end region of the second mixing path and/or the downstream end region of the second exhaust-gas treatment arrangement are arranged substantially in the same axial region with respect to the exhaust-gas treatment module longitudinal axis, and/or that the downstream end region of the first mixing path and/or the upstream end region of the first exhaust-gas treatment arrangement and/or the downstream end region of the second mixing path and/or the upstream end region of the second exhaust-gas treatment arrangement are arranged substantially in the same axial region with respect to the exhaust-gas treatment module longitudinal axis. This thus means that at least two of the upstream end regions or at least two of the downstream end regions are each positioned substantially in the same axial region.

For the flow connection of the various system regions, which follow one another, of the exhaust-gas treatment module, a first flow-diverting housing may be provided which connects the downstream end region of the first mixing path to the upstream end region of the first exhaust-gas treatment arrangement, and/or a second flow-diverting housing may be provided which connects the downstream end region of the first exhaust-gas treatment arrangement to the upstream end region of the second mixing path, and/or a third flow-diverting housing may be provided which connects the downstream end region of the second mixing path to the upstream end region of the second exhaust-gas treatment arrangement.

Owing to the substantially parallel arrangement of the system regions that are to be connected to one another by a respective flow-diverting housing, a diversion through substantially two times 90°, that is, approximately 180°, occurs in each of the flow-diverting housings. In order to be able to achieve this without significant flow constriction, it is proposed that at least one, preferably each, flow-diverting housing of first flow-diverting housing, second flow-diverting housing and third flow-diverting housing includes a housing inner wall which, together with a housing outer wall, delimits a flow-diverting volume, the housing inner wall of the at least one flow-diverting housing having provided therein an inlet opening, which leads to the flow-diverting volume, and an outlet opening, which leads out of the flow-diverting volume, of the at least one flow-diverting housing.

To assist the compact configuration, the second reactant dispensing arrangement may be supported on the second flow-diverting housing.

The introduction of exhaust gas into the exhaust-gas treatment module can be implemented in a likewise compact construction by virtue of the upstream end region of the first mixing path being connected to an inlet flow-diverting housing, and the first reactant dispensing arrangement being supported on the inlet flow-diverting housing.

Here, the inlet flow-diverting housing may include a housing inner wall which, together with a housing outer wall, delimits an inlet volume, the housing inner wall of the inlet flow-diverting housing having provided therein an outlet opening, which leads from the inlet volume into the first mixing path, of the inlet flow-diverting housing, and the first reactant dispensing arrangement being supported on the housing outer wall of the inlet flow-diverting housing.

In this context, it is pointed out that, in a or each flow-diverting housing or the inlet flow-diverting housing, the respective housing inner wall and the respective housing outer wall may be provided as plate-like or shell-like components, preferably deformed sheet-metal parts, which are connected to one another. It is self-evidently also possible for such diverting housings to be of pipe-like configuration, or to be assembled from more than two components, for example in order to be able to implement more complex geometries.

For efficient mixing of exhaust gas and reactant, the first reactant dispensing arrangement may be configured to dispense reactant substantially in a first reactant main dispensing direction into the first mixing channel, the first reactant main dispensing direction being oriented substantially in the direction of the first mixing path longitudinal axis, and/or the first reactant dispensing arrangement dispensing reactant substantially into a central region of the first mixing channel.

Furthermore, for this purpose, provision may be made for the second reactant dispensing arrangement to be configured to dispense reactant substantially in a second reactant main dispensing direction into the second mixing channel, the second reactant main dispensing direction being oriented substantially in the direction of the second mixing path longitudinal axis, and/or the second reactant dispensing arrangement dispensing reactant substantially into a central region of the second mixing channel.

Here, the first reactant main dispensing direction and the second reactant main dispensing direction may be oriented substantially parallel and identically to one another, which can promote in particular a compact construction in which the first reactant dispensing arrangement and the second reactant dispensing arrangement are arranged substantially in the same axial end region of the exhaust-gas treatment module with respect to the exhaust-gas treatment module longitudinal axis.

For efficient exhaust-gas purification, it is furthermore proposed that the first exhaust-gas treatment arrangement includes at least one, preferably a multiplicity of exhaust-gas treatment units arranged so as to follow one another in a flow direction, and/or that the second exhaust-gas treatment arrangement includes at least one, preferably a multiplicity of exhaust-gas treatment units arranged so as to follow one another in a flow direction.

In particular when used in conjunction with a diesel internal combustion engine, at least one, preferably each, exhaust-gas treatment arrangement may include at least one SCR catalytic converter unit.

The disclosure also relates to an exhaust-gas treatment system for a vehicle, including at least one exhaust-gas treatment module configured in accordance with the disclosure.

BRIEF DESCRIPTION OF THE DRAWINGS

The invention will now be described with reference to the drawings wherein.

DESCRIPTION OF THE PREFERRED EMBODIMENTS

Figure 1:
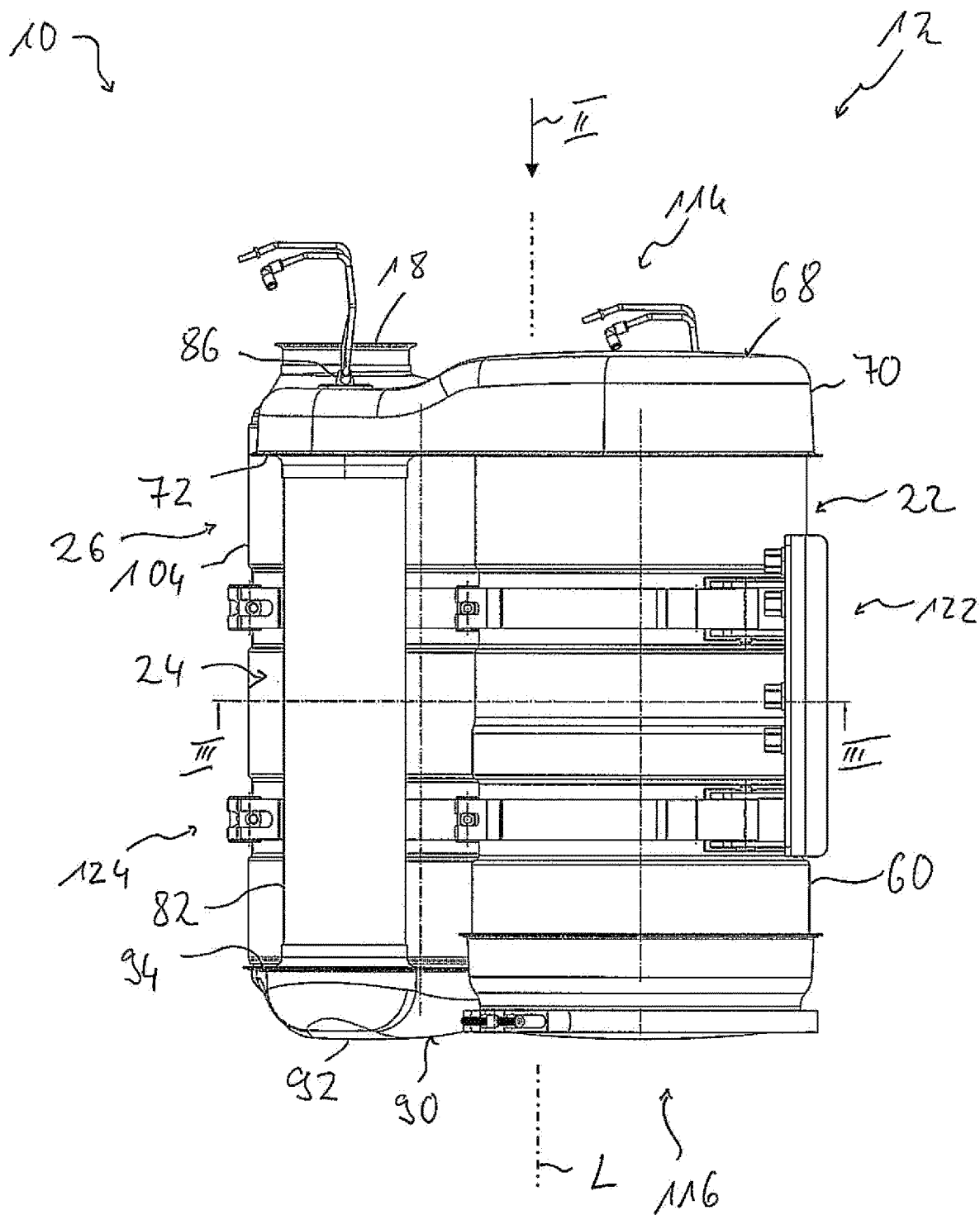
FIG. 1 shows an exhaust-gas treatment module for an exhaust system in a side view.
Figure 2:
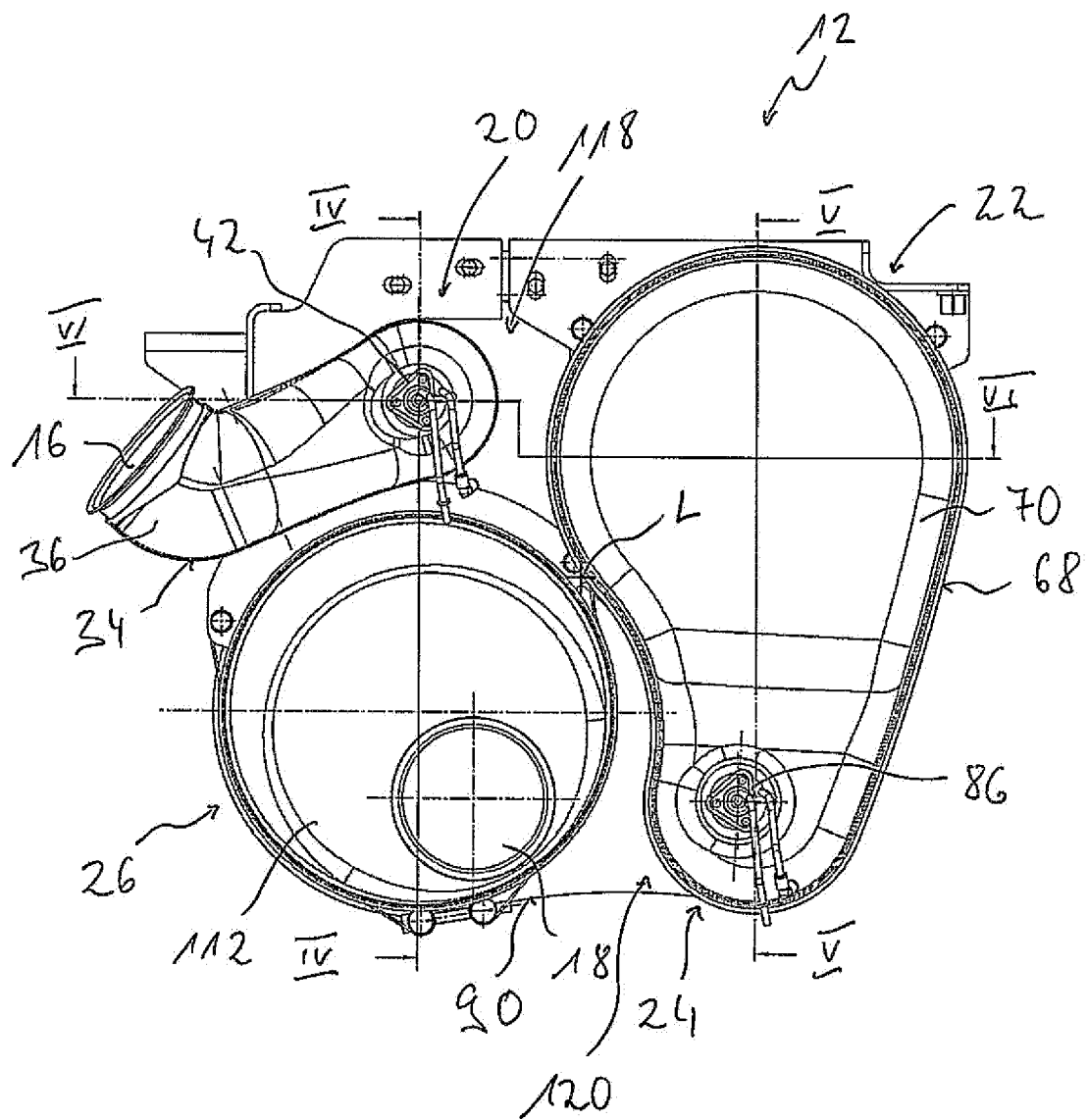
FIG. 2 shows an axial view of the exhaust-gas treatment module of FIG. 1 in the viewing direction II in FIG. 1.
Figure 3:
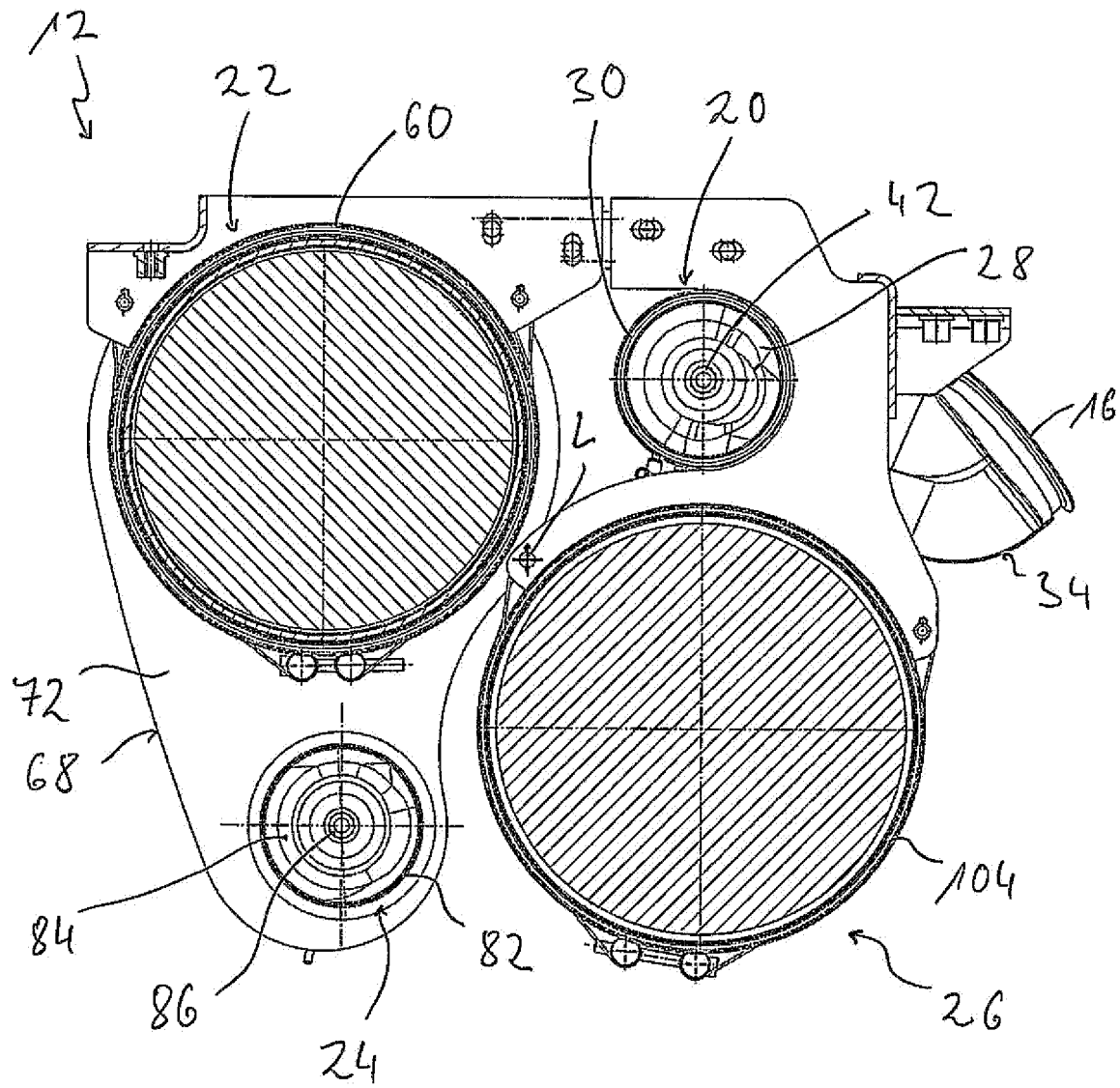
FIG. 3 shows a cross-sectional view of the exhaust-gas treatment module of FIG. 1 in section along a line III-III in FIG. 1.
Figure 4:
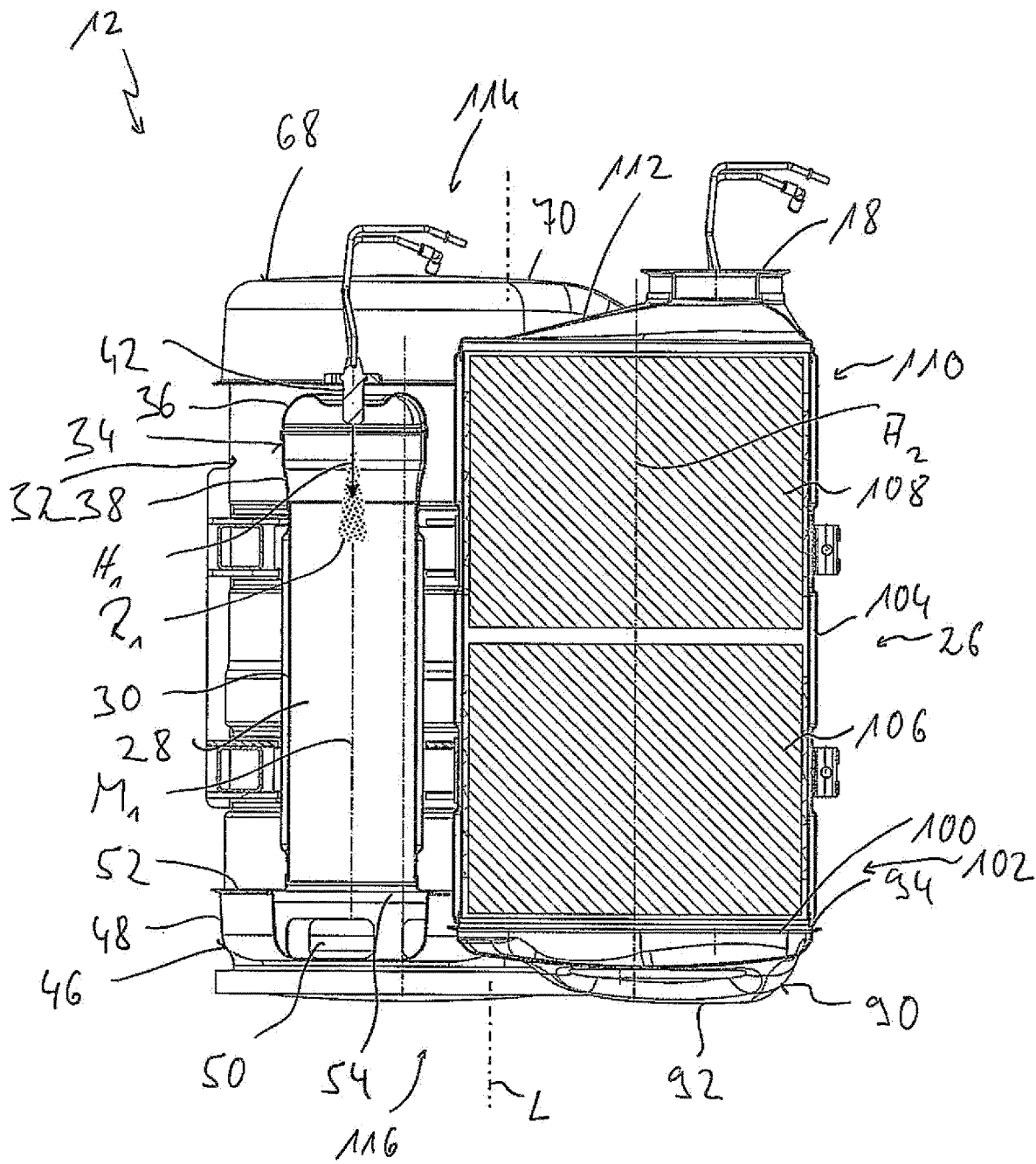
FIG. 4 shows a longitudinal sectional view of the exhaust-gas treatment module of FIG. 1 in section along a line IV-IV in FIG. 2.
Figure 5:
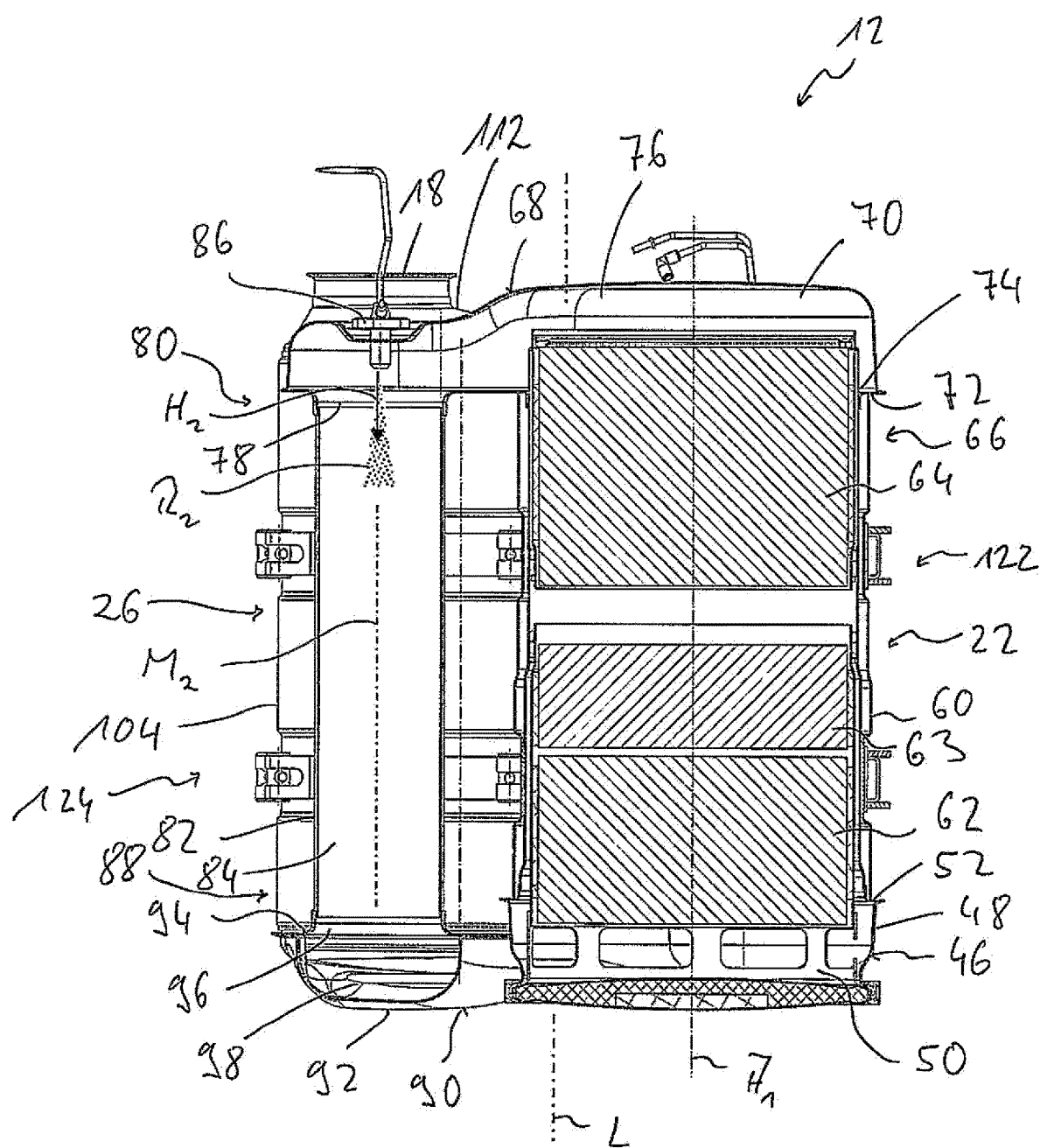
FIG. 5 shows a longitudinal sectional view of the exhaust-gas treatment module of FIG. 1 in section along a line V-V in FIG. 2; and, FIG. 6 shows a longitudinal sectional view of the exhaust-gas treatment module of FIG. 1 in section along a line VI-VI in FIG. 2.

In FIGS. 1 to 6, an exhaust-gas treatment module that can be used for example in an exhaust system 10 of an internal combustion engine in a utility motor vehicle is denoted generally by 12. The exhaust-gas treatment module 12 has a substantially cuboidal or cubiform outer peripheral contour and is elongate in the direction of an exhaust-gas treatment module longitudinal axis L. The exhaust-gas treatment module longitudinal axis L substantially also defines a region of the geometrical center of the exhaust-gas treatment module 12 transversely with respect to the exhaust-gas treatment module longitudinal axis L.

Between an exhaust-gas inlet 16 and an exhaust-gas outlet 18, the exhaust-gas treatment module 12 includes substantially four system regions that follow one another in an exhaust-gas flow direction. These are a first mixing path 20, which follows the exhaust-gas inlet 16, a first exhaust-gas treatment arrangement 22, which follows the first mixing path 20, a second mixing path 24, which follows the first exhaust-gas treatment arrangement 22, and a second exhaust-gas treatment arrangement 26, which follows the second mixing path 24 and which leads to, or provides, the exhaust-gas outlet 18.

Figure 6:
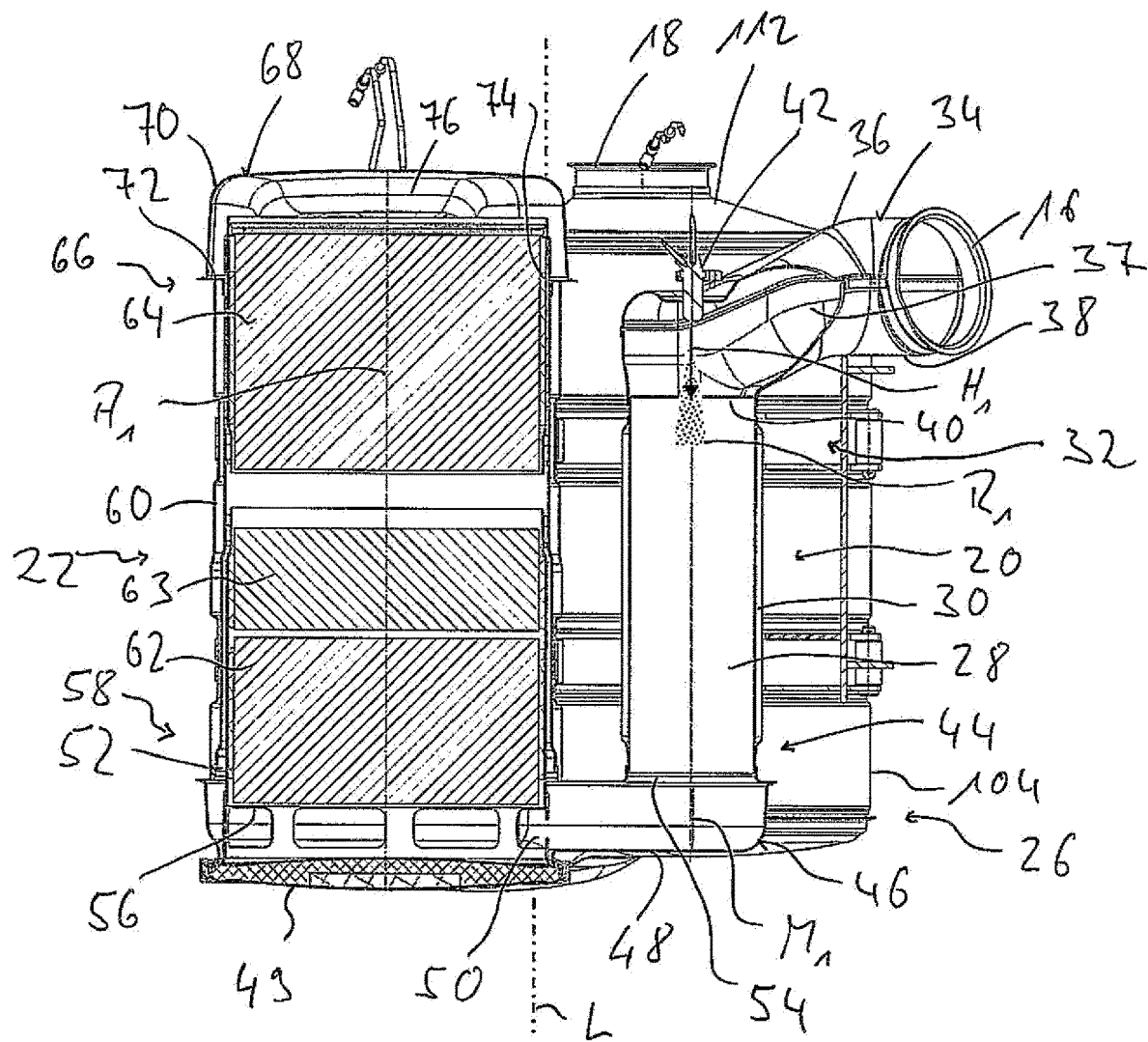

The first mixing path 20, which can be seen in FIG. 6, includes a first mixing path pipe 30, which is elongate in the direction of a first mixing path longitudinal axis $M_1$ and which provides a first mixing channel 28 and which is for example of double-walled configuration at least in certain regions. At an upstream end region 32 of the first mixing path 20, the first mixing path pipe 30 adjoins an inlet flow-diverting housing 34. The inlet flow-diverting housing 34 provides the exhaust-gas inlet 16 and is constructed with a housing outer wall 36 and a housing inner wall 38, which may for example be connected to one another by welding in an edge region, and which may together delimit an inlet volume 37. An outlet opening 40 of the inlet flow-diverting housing 34 is provided on the housing inner wall 38, which outlet opening is adjoined by the first mixing path pipe 30 or the first mixing channel 28 formed therein, which is thus open to the inlet volume 37.

On the outer housing wall 36 of the inlet flow-diverting housing 34, a first reactant dispensing arrangement 42, referred to generally as injector, is supported so as to introduce reactant $R_1$, for example a urea/water solution, in a first reactant main dispensing direction $H_1$ substantially in the direction of the first mixing path longitudinal axis $M_1$ and substantially centrally, that is, in a region central transversely with respect to the first mixing path longitudinal axis $M_1$, into the first mixing path 20 or the first mixing path channel 28. Here, for example, the first reactant main dispensing direction $H_1$ may substantially correspond to a central axis of the spray cone of the reactant $R_1$ that is dispensed by the first reactant dispensing arrangement 42.

A downstream end region 44 of the first mixing path 20 or of the first mixing channel 28 adjoins a first flow-diverting housing 46. The first flow-diverting housing 46 is for example constructed with a substantially shell-like housing outer wall 48 and with a housing inner wall 52 which, together with the housing outer wall, delimits a first flow-diverting volume 50. In the housing inner wall 52, there is formed an inlet opening 54 via which the first mixing channel 28 is open to the first flow-diverting volume 50 that is formed in the first flow-diverting housing 46. In the housing inner wall 52, there is furthermore formed an outlet opening 56 via which the first flow-diverting volume 50 is open to an upstream end region 58 of the first exhaust-gas treatment arrangement 22.

In a first exhaust-gas treatment arrangement housing 60, which is for example of double-walled configuration at least in certain regions, the first exhaust-gas treatment arrangement 22 includes three exhaust-gas treatment units 62, 63, 64 which follow one another in the direction of a first exhaust-gas treatment arrangement longitudinal axis $A_1$. Each of these exhaust-gas treatment units 62, 63, 64 may include an exhaust-gas treatment block, which is supported in a casing and which is for example of monolithic construction and which has a porous structure and which is for example coated and/or constructed with catalytically active material. In the arrangement illustrated in FIG. 6, the exhaust-gas treatment unit 62 that is positioned furthest upstream may for example be an SCR catalytic converter unit. The exhaust-gas treatment unit 63 that then follows in a flow direction may be a diesel oxidation catalytic converter unit, and the exhaust-gas treatment unit 64 that is positioned furthest downstream in the first exhaust-gas treatment arrangement 22 may be a particle filter unit.

The SCR catalytic converter unit and the diesel oxidation catalytic converter unit may be supported together, for example using a fiber material layer surrounding each of these, in a common casing, which may be inserted, in the region of the upstream end region 58 of the first exhaust-gas treatment arrangement 22, into the first exhaust-gas treatment arrangement housing 60. In the region, which is situated opposite this upstream end region 58, a releasably attached cover 49, which closes off an opening, may be supported on the housing outer wall 48 of the first flow-diverting housing 46, via which cover there is access to the assembly including the two exhaust-gas treatment units 62, 63 and the casing surrounding these. This assembly may be held on the first flow-diverting housing 46, and thus also in the first exhaust-gas treatment arrangement housing 60, by the cover 49.

By removal of the cover 49, the assembly including the two exhaust-gas treatment units 62, 63 can thus, in particular when the exhaust-gas treatment unit 62 configured as an SCR catalytic converter unit has reached the end of its operational service life, be removed from the first exhaust-gas treatment arrangement 22 and replaced with a corresponding new assembly. This assembly, or the exhaust-gas treatment unit 62 that is positioned furthest upstream, is exposed to the relatively hot exhaust gases discharged from an internal combustion engine to a much greater degree than all of the other exhaust-gas treatment units, from which it can be assumed that these will not need to be replaced over the entire operational service life of the exhaust-gas treatment module 12.

The two exhaust-gas treatment units 62, 63 could also be provided, decoupled from one another, as separate assemblies, for example with a respective casing, wherein the exhaust-gas treatment unit 63, and likewise for example the exhaust-gas treatment unit 64 that follows this further downstream, can then be fixedly installed, with a casing surrounding a respective exhaust-gas treatment block, in the first exhaust-gas treatment arrangement housing 60.

A second flow-diverting housing 68 adjoins a downstream end region 66 of the first exhaust-gas treatment arrangement 22. This, too, is constructed with a housing outer wall 70, which is for example of shell-like configuration, and a housing inner wall 72, which is for example of plate-like configuration.

Through an inlet opening 74 formed in the housing inner wall 72, the first exhaust-gas treatment arrangement 22 is open to a second flow-diverting volume 76 that is formed in the second flow-diverting housing 68. It is pointed out here that, for example, the first exhaust-gas treatment arrangement housing 60 may be positioned so as to adjoin the housing inner wall 52 of the first flow-diverting housing 46 and/or the housing inner wall 72 of the second flow-diverting housing 68, or so as to engage into the outlet opening 56 or the inlet opening 74, and may be connected, for example by welding, to the respective housing inner wall 52 or 72 in order to provide a gas-tight closure.

Via an outlet opening 78 formed in the housing inner wall 72 of the second flow-diverting housing 68, the second flow-diverting volume 76, which is formed in the second flow-diverting housing 68, is open to an upstream end region 80 of the second mixing path 24. The second mixing path 24 includes a second mixing path pipe 82, which is of single-walled or double-walled configuration and which has a second mixing channel 84 formed therein. The second mixing path pipe 82 or the second mixing channel 84 formed therein is elongate in the direction of a second mixing path longitudinal axis $M_2$ of the second mixing path 24.

On the housing outer wall 70 of the second flow-diverting housing 68, a second reactant dispensing arrangement 86, referred to generally as injector, is supported so as to dispense a reactant $R_2$ in a second reactant main dispensing direction $H_2$ into the second mixing channel 84. Here, the second reactant dispensing arrangement 86 is preferably positioned and oriented such that the second reactant main dispensing direction $H_2$ is substantially parallel, or corresponds, to the second mixing path longitudinal axis $M_2$, and such that, transversely with respect to the second mixing path longitudinal axis $M_2$, the reactant $R_2$ is injected substantially into a central region of the second mixing channel 84.

In a downstream end region 88 of the second mixing path 24, the second mixing path pipe 82 adjoins a third flow-diverting housing 90. The third flow-diverting housing 90 is constructed with a housing outer wall 92, which is for example of shell-like construction, and a housing inner wall 94, which is for example of plate-like configuration, which housing outer wall and housing inner wall may be connected to one another in gas-tight fashion, for example by welding, in an edge region. In the housing inner wall 94, there is formed an inlet opening 96 via which the second mixing channel 84 is open to a third flow-diverting volume 98 that is formed in the third flow-diverting housing 90.

In the housing inner wall 94 of the third flow-diverting housing 90, there is formed an outlet opening 100 via which the third flow-diverting volume 98, which is formed in the third flow-diverting housing 90, is open to an upstream end region 102 of the second exhaust-gas treatment arrangement 26. The second exhaust-gas treatment arrangement 26 includes a second exhaust-gas treatment arrangement housing 104, which may for example be of double-walled configuration at least in certain regions, and in which, for example, there may be arranged two exhaust-gas treatment units 106, 108 which are arranged so as to follow one another in the direction of a second exhaust-gas treatment arrangement longitudinal axis $A_2$. Each of the exhaust-gas treatment units 106, 108 may be an SCR catalytic converter unit with an exhaust-gas treatment block which is for example of monolithic construction and coated and/or constructed with catalytically active material and which either may be directly supported in the second exhaust-gas treatment arrangement housing 104, for example with the use of a fiber mat or the like, or may be supported in a casing that is received in the second exhaust-gas treatment arrangement housing 104.

At a downstream end region 110 of the second exhaust-gas treatment arrangement 26, the second exhaust-gas treatment arrangement housing 104 is adjoined by a closure cover 112 in which the exhaust-gas outlet opening 18 of the exhaust-gas treatment module 12 is provided and via which the exhaust gas exits the exhaust-gas treatment module 12 with a reduced pollutant content.

It can be seen from FIGS. 1 to 6 that, in the exhaust-gas treatment module 12, the various system regions that follow one another in the exhaust-gas flow direction, that is, the first mixing path 20, the first exhaust-gas treatment arrangement 22, the second mixing path 24 and the second exhaust-gas treatment arrangement 26, are arranged such that their longitudinal axes, that is, the first mixing path longitudinal axis $M_1$, the first exhaust-gas treatment arrangement longitudinal axis $A_1$, the second mixing path longitudinal axis $M_2$ and the second exhaust-gas treatment arrangement longitudinal axis $A_2$, are arranged substantially parallel to one another and in particular also to the exhaust-gas treatment module longitudinal axis L. Furthermore, these four system regions are arranged such that the upstream end region 32 of the first mixing path 20, the downstream end region 66 of the first exhaust-gas treatment arrangement 22, the upstream end region 80 of the second mixing path 24 and the downstream end region 110 of the second exhaust-gas treatment arrangement 26 are positioned substantially in the same axial region with respect to the exhaust-gas treatment module longitudinal axis L, and in particular also substantially in the same axial end region 114 of the exhaust-gas treatment module 12. Likewise, the downstream end region 44 of the first mixing path 20, the upstream end region 58 of the first exhaust-gas treatment arrangement 22, the downstream end region 88 of the second mixing path 24 and the upstream end region 102 of the second exhaust-gas treatment arrangement 26 are positioned substantially in the same axial end region with respect to the exhaust-gas treatment module longitudinal axis L, and in particular in the same, that is, the other, axial end region 116 of the exhaust-gas treatment module 12. This contributes to a compact construction with the cuboidal or cubiform structure of the exhaust-gas treatment arrangement 12 already discussed above, in which the two exhaust-gas treatment arrangements 22, 26 are situated substantially diametrically opposite one another with respect to the exhaust-gas treatment module longitudinal axis L, and the two mixing paths 20, 24 are also situated substantially diametrically opposite one another with respect to the exhaust-gas treatment module longitudinal axis L. The result is therefore a structure in which, in a peripheral direction around the exhaust-gas treatment module longitudinal axis L, the first mixing path 20, the first exhaust-gas treatment arrangement 22, the second mixing path 24 and the second exhaust-gas treatment arrangement 26 follow one another. The two mixing paths 20, 24, which have a smaller extent transversely with respect to their respective mixing path longitudinal axes $M_1$, $M_2$ than the two exhaust-gas treatment arrangements 22, 26 each with respect to their exhaust-gas treatment arrangement longitudinal axes $A_1$, $A_2$, can thus be accommodated in the space regions 118, 120 that are formed laterally adjacent to the mutually oppositely situated exhaust-gas treatment arrangements 22, 26.

In the case of the construction of an exhaust-gas treatment module shown in FIGS. 1 to 6, provision is furthermore made for the two reactant dispensing arrangements 42, 86, which may be structurally identical to one another, to be arranged substantially in the same axial region, in particular at the same axial end region 114 of the exhaust-gas treatment module 12. This allows the two reactant dispensing arrangements 42, 86 to be easily connected to a reactant tank in a vehicle. Furthermore, there is easy access to both reactant dispensing arrangements 42, 86 from the same axial side of the exhaust-gas treatment module 12 for the purposes of carrying out maintenance or repair work.

In the exhaust-gas treatment module 12, the two mixing paths 20, 24 or the mixing path pipes 30, 82 may be substantially structurally identical to one another, and can be easily varied in length for the purposes of adaptation to different constructions. The two exhaust-gas treatment arrangements 22, 26 may also be substantially structurally identical to one another, and can likewise be easily adapted in length to different intended uses. Since there is no functional need for the two exhaust-gas treatment arrangements 22, 26 to have a direct mechanical connection to one another, and these are instead coupled to one another via the two flow-diverting housings 68, 90 and the second mixing path 24, the exhaust-gas treatment arrangements may in principle be configured to be of mutually different lengths. A variation of the length of the second exhaust-gas treatment arrangement 26 leads to a corresponding variation of the position of the exhaust-gas outlet 18. Likewise, a variation of the length of the first exhaust-gas treatment arrangement 22 leads to a corresponding variation of the position of the first flow-diverting housing 46. The length of the first mixing path 20 may also be chosen substantially freely, and a variation of the length of the first mixing path 20 leads to a corresponding variation of the position of the inlet flow-diverting housing 34 in particular with respect to the first flow-diverting housing 46. For example, in the configuration illustrated in FIGS. 1 to 6, a shorter configuration of the first mixing path 20 may lead to a construction in which the upstream end region 32 thereof is relocated further into an axially central region of the exhaust-gas treatment module 12.

In order to incorporate such an exhaust-gas treatment module 12 into a vehicle, it is for example possible for the two exhaust-gas treatment units 22, 26 to be equipped with fastening structures 122, 124, which may for example each include one or more belt-like fastening straps, which surround the respective exhaust-gas treatment arrangement housing 60 or 104 and which are for example constructed with steel material or the like and which may be attached to respective members that are to be fixed by screw connection to a vehicle.

In particular when used in conjunction with a diesel internal combustion engine, the reactant $R_1$, $R_2$ that is dispensed by the reactant dispensing arrangements 42, 86 into the mixing paths 20, 24 may be a mixture of urea and water. Here, the quantities of the reactant $R_1$, $R_2$ respectively dispensed by the reactant dispensing arrangements 42, 86 may be identical to one another or, taking into consideration the fact that the exhaust gas that enters the second mixing path 24 already has a reduced nitrogen oxide fraction, may differ from one another.

It is understood that the foregoing description is that of the preferred embodiments of the invention and that various changes and modifications may be made thereto without departing from the spirit and scope of the invention as defined in the appended claims.

What is claimed is:

1. An exhaust-gas treatment module for an exhaust system of an internal combustion engine, the exhaust-gas treatment module defining an exhaust-gas flow direction and an exhaust-gas treatment module longitudinal axis (L), said exhaust-gas treatment module comprising:
a first exhaust-gas treatment arrangement;
a first mixing path associated with said first exhaust-gas treatment arrangement and having upstream and downstream end regions and defining a first mixing path longitudinal axis ($M_1$);
said first mixing path including a first reactant dispensing arrangement in said upstream end region thereof for dispensing a first reactant;
said first mixing path further including a first mixing channel elongated in a direction of said first mixing path longitudinal axis ($M_1$);
said first exhaust-gas treatment arrangement defining a first exhaust-gas treatment longitudinal axis ($A_1$) and being elongated in a direction of said first exhaust-gas treatment longitudinal axis ($A_1$), said first exhaust-gas treatment arrangement including at least one exhaust-gas treatment unit, at least one exhaust-gas treatment unit of said at least one exhaust-gas treatment unit of said first exhaust-gas treatment arrangement including at least one SCR catalytic converter unit;
said first exhaust-gas treatment arrangement having upstream and downstream end regions and said upstream end region being connected to said downstream end region of said first mixing path;
a second exhaust-gas treatment arrangement;
a second mixing path associated with said second exhaust-gas treatment arrangement and defining a second mixing path longitudinal axis ($M_2$) and having upstream and downstream end regions and said upstream end region thereof being connected to said downstream end region of said first exhaust-gas treatment arrangement;
said second mixing path having a second reactant dispensing arrangement in said upstream end region thereof for dispensing a second reactant;
said second mixing path having a second mixing channel elongated in a direction of said second mixing path longitudinal axis ($M_2$);
said second exhaust-gas treatment arrangement defining a second exhaust-gas treatment arrangement longitudinal axis ($A_2$) and being elongated in a direction of said second exhaust-gas treatment longitudinal axis ($A_2$), said second exhaust-gas treatment arrangement including at least one exhaust-gas treatment unit, at least one exhaust-gas treatment unit of said at least one exhaust-gas treatment unit of said second exhaust-gas treatment arrangement including at least one SCR catalytic converter unit;
said second exhaust-gas treatment arrangement having an upstream end region connected to said downstream end region of said second mixing path and a downstream end region open for releasing at least one of exhaust gas and reactant; and,
wherein said first mixing path, said first exhaust-gas treatment arrangement, said second mixing path and said second exhaust-gas treatment arrangement overlap one another in a direction of said exhaust-gas treatment module longitudinal axis (L), wherein said first mixing path, said first exhaust-gas treatment arrangement, said second mixing path and said second exhaust-gas treatment arrangement are arranged so as to follow one another about said exhaust-gas treatment module longitudinal axis (L) so as to cause said first mixing path and said second mixing path to lie diametrically opposite one another with respect to said exhaust-gas treatment module longitudinal axis (L) and so as to cause said first exhaust-gas treatment arrangement and said second exhaust-gas treatment arrangement to lie diametrically opposite one another with respect to said exhaust-gas treatment module longitudinal axis (L).

2. The exhaust-gas treatment module of claim 1, wherein said first mixing path longitudinal axis ($M_1$), said first exhaust-gas treatment arrangement longitudinal axis ($A_1$), said second mixing path longitudinal axis ($M_2$) and said second exhaust-gas treatment arrangement longitudinal axis ($A_2$) being at least one of the following:
i) mutually parallel; and,
ii) parallel to said exhaust-gas treatment module longitudinal axis (L).

3. The exhaust-gas treatment module of claim 1, wherein at least one of said upstream end region of said first mixing path, said downstream end region of said first exhaust-gas treatment arrangement, said upstream end region of said second mixing path and said downstream end region of said second exhaust-gas treatment arrangement are arranged in the same axial region with respect to said exhaust-gas treatment module longitudinal axis (L).

4. The exhaust-gas treatment module of claim 1, wherein at least one of said downstream end region of said first mixing path, said upstream end region of said first exhaust-gas treatment arrangement, said downstream end region of said second mixing path and said upstream end region of said second exhaust-gas treatment arrangement are arranged in the same axial region with respect to the exhaust-gas treatment module longitudinal axis (L).

5. The exhaust-gas treatment module of claim 1, wherein at least one of the following applies:
a) said exhaust-gas treatment module further comprises a first flow-diverting housing connecting said downstream end region of said first mixing path to said upstream end region of said first exhaust-gas treatment arrangement;
b) said exhaust-gas treatment module further comprises a second flow-diverting housing connecting said downstream end region of said first exhaust-gas treatment arrangement to said upstream end region of said second mixing path; and,
c) said exhaust-gas treatment module further comprises a third flow-diverting housing connecting said downstream end region of said second mixing path to said upstream end region of said second exhaust-gas treatment arrangement.

6. The exhaust-gas treatment module of claim 5, further comprising first, second and third outer housing walls;
said first, second and third flow-diverting housings having respective first, second and third housing inner walls;
said first, second and third outer housing walls and said first, second and third housing inner walls conjointly defining respective first, second and third flow-diverting volumes; and,
said first, second and third housing inner walls having respective first, second and third inlet openings leading to corresponding ones of said first, second and third flow-diverting volumes and having respective first, second and third outlet openings leading out of corresponding ones of said first, second and third flow-diverting volumes.

7. The exhaust-gas treatment module of claim 5, wherein said second reactant dispensing arrangement is supported on the second flow-diverting housing.

8. The exhaust-gas treatment module of claim 1, further comprising an inlet flow-diverting housing; said upstream end region of said first mixing path being connected to said inlet flow-diverting housing; and, said first reactant dispensing arrangement being supported on said inlet flow-diverting housing.

9. The exhaust-gas treatment module of claim 8, wherein said inlet flow-diverting housing includes a housing inner wall and a housing outer wall; said housing inner wall and said housing outer wall conjointly delimit an inner volume; said housing inner wall of said inlet flow-diverting housing has an outlet opening provided therein leading from said inlet volume into said first mixing path; said outlet opening is an outlet opening of said inlet flow-diverting housing; and, said first reactant dispensing arrangement is supported on said housing outer wall of said inlet flow-diverting housing.

10. The exhaust-gas treatment module of claim 1, wherein said first reactant dispensing arrangement is configured to dispense reactant ($R_1$) in a first reactant main dispensing direction ($H_1$) in said first mixing channel; and, wherein at least one of the following applies:
a) said first reactant main dispensing direction ($H_1$) is orientated in the direction of said first mixing path longitudinal axis ($M_1$); and,
b) said first reactant dispersing arrangement dispenses reactant ($R_1$) into a central region of said first mixing channel.

11. The exhaust-gas treatment module of claim 1, wherein the first reactant dispensing arrangement is arranged for dispensing a mixture of urea and water as the first reactant and the second reactant dispensing arrangement is arranged for dispensing a mixture of urea and water as the second reactant.

12. The exhaust-gas treatment module of claim 1, wherein said second reactant dispensing arrangement is configured to dispense said second reactant ($R_2$) in a second reactant main dispensing direction ($H_2$) into said second mixing channel; and, wherein at least one of the following applies:
a) said second reactant main dispensing direction ($H_2$) is orientated in the direction of said second mixing path longitudinal axis ($M_2$); and,
b) said second reactant dispensing arrangement dispenses said second reactant ($R_2$) into a central region of said second mixing channel.

13. The exhaust-gas treatment module of claim 12, wherein said first reactant dispensing arrangement is configured to dispense said first reactant ($R_1$) in a first reactant main dispensing direction ($H_1$) in said first mixing channel; and, wherein at least one of the following applies:
a) said first reactant main dispensing direction ($H_1$) is orientated in the direction of said first mixing path longitudinal axis ($M_1$); and,
b) said first reactant dispensing arrangement dispenses reactant ($R_1$) into a central region of said first mixing channel;
wherein said first reactant main dispensing direction ($H_1$) and said second reactant main dispensing direction ($H_2$) are orientated parallel and identically to one another.

14. The exhaust-gas treatment module of claim 1, wherein said first reactant dispensing arrangement and said second reactant dispensing arrangement are arranged in the same axial end region of said exhaust-gas treatment module with respect to said exhaust-gas treatment module longitudinal axis (L).

15. The exhaust-gas treatment module of claim 1, wherein at least one of the following applies:
a) said first exhaust-gas treatment arrangement includes a plurality of said exhaust-gas treatment units arranged so as to follow one another in said flow direction; and, b) said second exhaust-gas treatment arrangement includes a multiplicity of said exhaust-gas treatment units arranged so as to follow one another in said flow direction.

16. An exhaust-gas treatment system for a vehicle, the exhaust-gas treatment system comprising:
    at least one exhaust-gas treatment module defining an exhaust-gas flow direction and an exhaust-gas treatment module longitudinal axis (L);
    said exhaust-gas treatment module including:
    a first exhaust-gas treatment arrangement;
    a first mixing path associated with said first exhaust-gas treatment arrangement and having upstream and downstream end regions and defining a first mixing path longitudinal axis ($M_1$);
    said first mixing path including a first reactant dispensing arrangement in said upstream end region thereof for dispensing a first reactant;
    said first mixing path further including a first mixing channel elongated in a direction of said first mixing path longitudinal axis ($M_1$);
    said first exhaust-gas treatment arrangement defining a first exhaust-gas treatment longitudinal axis ($A_1$) and being elongated in a direction of said first exhaust-gas treatment longitudinal axis ($A_1$), said first exhaust-gas treatment arrangement including at least one exhaust-gas treatment unit, at least one exhaust-gas treatment unit of said at least one exhaust-gas treatment unit of said first exhaust-gas treatment arrangement including at least one SCR catalytic converter unit;
    said first exhaust-gas treatment arrangement having upstream and downstream end regions and said upstream end region being connected to said downstream end region of said first mixing path;
    a second exhaust-gas treatment arrangement;
    a second mixing path associated with said second exhaust-gas treatment arrangement and defining a second mixing path longitudinal axis ($M_2$) and having upstream and downstream end regions and said upstream end region thereof being connected to said downstream end region of said first exhaust-gas treatment arrangement;
    said second mixing path having a second reactant dispensing arrangement in said upstream end region thereof for dispensing a second reactant;
    said second mixing path having a second mixing channel elongated in a direction of said second mixing path longitudinal axis ($M_2$);
    said second exhaust-gas treatment arrangement defining a second exhaust-gas treatment arrangement longitudinal axis ($A_2$) and being elongated in a direction of said second exhaust-gas treatment longitudinal axis ($A_2$), said second exhaust-gas treatment arrangement including at least one exhaust-gas treatment unit, at least one exhaust-gas treatment unit of said at least one exhaust-gas treatment unit of said second exhaust-gas treatment arrangement including at least one SCR catalytic converter unit;
    said second exhaust-gas treatment arrangement having an upstream end region connected to said downstream end region of said second mixing path and a downstream end region open for releasing at least one of exhaust gas and reactant; and,
    wherein said first mixing path, said first exhaust-gas treatment arrangement, said second mixing path and said second exhaust-gas treatment arrangement overlap one another in a direction of said exhaust-gas treatment module longitudinal axis (L), wherein said first mixing path, said first exhaust-gas treatment arrangement, said second mixing path and said second exhaust-gas treatment arrangement are arranged so as to follow one another about said exhaust-gas treatment module longitudinal axis (L) so as to cause said first mixing path and said second mixing path to lie diametrically opposite one another with respect to said exhaust-gas treatment module longitudinal axis (L) and so as to cause said first exhaust-gas treatment arrangement and said second exhaust-gas treatment arrangement to lie diametrically opposite one another with respect to said exhaust-gas treatment module longitudinal axis (L).

17. The exhaust-gas treatment system of claim 16, wherein said first mixing path longitudinal axis ($M_1$), said first exhaust-gas treatment arrangement longitudinal axis ($A_1$), said second mixing path longitudinal axis ($M_2$) and said second exhaust-gas treatment arrangement longitudinal axis ($A_2$) being at least one of the following:
    i) mutually parallel; and,
    ii) parallel to said exhaust-gas treatment module longitudinal axis (L).

18. The exhaust-gas treatment system of claim 16, wherein the first reactant dispensing arrangement is arranged for dispensing a mixture of urea and water as the first reactant and the second reactant dispensing arrangement is arranged for dispensing a mixture of urea and water as the second reactant.

* * * * *